Feb. 5, 1946. F. BURCHELL ET AL 2,393,969
DISPLAY DEVICE
Filed July 31, 1943 2 Sheets-Sheet 2

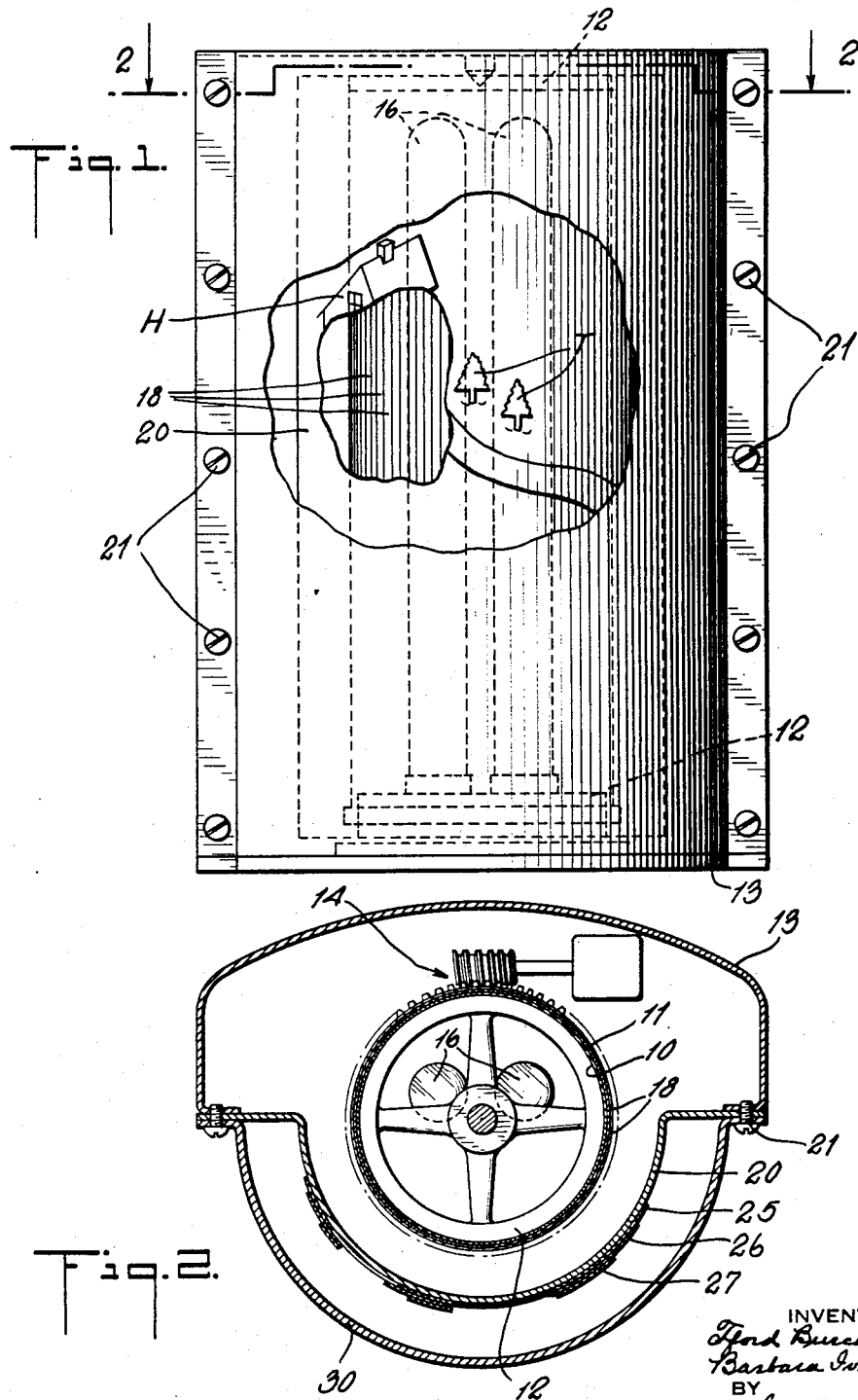

INVENTORS
Fford Burchell
Barbara Ivins
BY
Kenyon & Kenyon
ATTORNEYS

Patented Feb. 5, 1946

2,393,969

UNITED STATES PATENT OFFICE 2,393,969

DISPLAY DEVICE

Fford Burchell and Barbara Ivins, New York, N. Y., assignors to Burchell-Holloway Corporation, New York, N. Y., a corporation of New York Application July 31, 1943, Serial No. 496,928

5 Claims. (Cl. 88—65)

This invention relates to a method of and apparatus for producing colored designs, and more specifically to apparatus utilizing translucent designs of doubly refracting material that are arranged to be acted upon by polarized light.

Such apparatus, heretofore, has comprised a light source, a polarizer and an analyzer, each consisting of a plane disc of polarizing material with interposition between the two of a birefringent design built up on a plane area. In such devices it has been customary to rotate either the polarizer or the analyzer in its own plane so that the optical axis of the polarizer or analyzer is made to vary with respect to the other. The optical axis of the polarized light varied in passing from polarizer to analyzer and was intercepted by the birefringent design. The birefringent design in turn acted upon the polarized light passing through it and as a result changing color effects were visible when viewed through the analyzer. The color effect, by choice of the design and its component parts, for example (in a manner described in a co-pending application Serial No. 337,744, filed May 29, 1940), could be caused to vary greatly and to produce novel and startling effects. Colors could be made to pass successively along a portion of a design, the design could be made to show changes in size, that while seemingly real, were optical illusions. Similarly, apparent relative displacement of parts of the design could be made to appear.

A limitation on such apparatus was that the designs were required to be built upon substantially flat surfaces in order that the results could be predictable and uniform, and much of the color effect was lost when viewed from an angle.

The present invention makes it possible to extend the application of the principles of the earlier devices to polarized light displays with the design in the form of a cylinder or a portion thereof. In other words, it is an object of this invention to make it possible to provide polarized light displays with a design in the form of a cylinder or a portion thereof and in which the same types of effects heretofore possible with "plane" displays can now be achieved in curved or cylindrical displays. Such curved or cylindrical displays have the advantage over "plane" displays that identical effects can be obtained when the display is viewed from different angular positions with respect to the display surface.

Another object of the invention is to provide a device that will efficiently perform the purposes for which it is intended, which is simple and economical in construction, which can be expeditiously and conveniently manipulated and which can be readily manufactured and assembled in quantity.

To the accomplishment of the foregoing and such other objects as may hereafter appear, the invention consists in the novel method, construction and operation of parts hereinafter to be described in detail and then sought to be defined in the appended claims, reference being had to the accompanying drawings forming a part hereof which illustrate merely for the purposes of illustration, disclosure of preferred embodiment of the invention, it being expressly understood, however, that changes may be made in practice within the scope of the claims without digressing from the inventive idea.

In the drawings in which similar reference characters denote corresponding parts:

Fig. 1 is a front elevation of one form of device embodying the invention;

Fig. 2 is a transverse section taken along line 2—2 of Fig. 1, viewed in the direction of the arrows;

Figure 3:
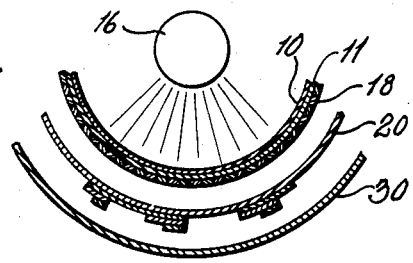
Fig. 3 is a diagrammatic section on an enlarged scale illustrating in section a construction somewhat modified in form.
Figures 4, 5:
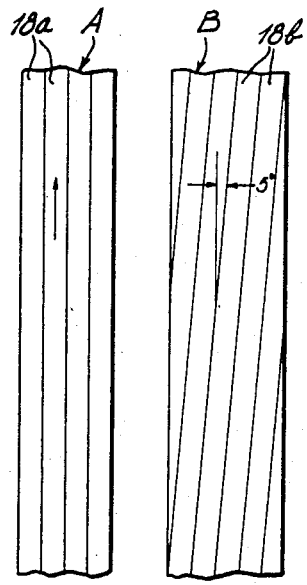
Figs. 4, 5, 6 and 7 are diagrammatic illustrations of a method of preparing elements utilized in a device embodying the invention.
Figure 6:
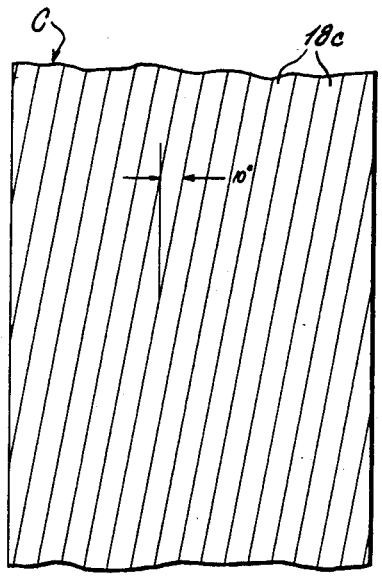
Figure 7:
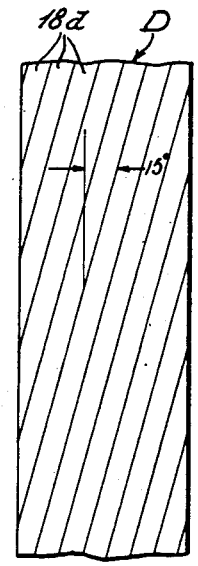

Referring to the drawings, 10 denotes a cylindrical tube of translucent isotropic material, for example, matte cellulose acetate or the like. Concentric with the tube 10 is a cylinder 11 of polarizing material, e. g., "Polaroid." The polarizing direction of the "Polaroid" tube may be anything desired. The two tubes 10 and 11 in the embodiment shown, are in contact with each other but it is not essential that such contact exist. They are supported as a unit from any suitable means such as a rotary base, cage or frame 12, in a casing 13 in such a way that the cylinders 10 and 11 may be made to rotate about their longitudinal center line. The tubes 10, and 11 may be described as hollow bodies having uniform cross sectional area in their lengths and as concentrically arranged with the latter externally of the former. Suitable motor driven gearing 14, or any other means may be provided to so rotate said cylinders about said axis.

Figure 9:
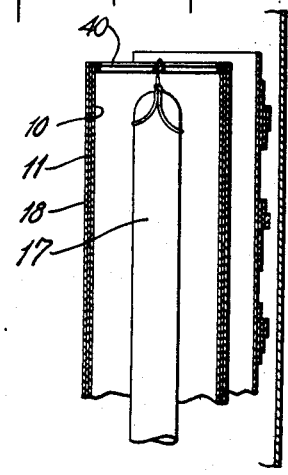
Fig. 9 is a partial vertical section of a device embodying the invention, in which the movable parts are driven by heat.
Figure 11:
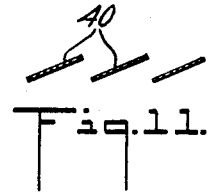
Fig. 11 is a section taken along line 11—11 of Fig. 10 and viewed in the direction of the arrows.

Within the inner cylinder 10, a conventional elongated fluorescent tube or tubes 16 may be utilized to provide a light source. In the alternative, elongated electric light bulbs 17 of conventional design (Fig. 9) may be utilized for the same purposes; or any other suitable source of light may be used, preferably one that will distribute the light uniformly along the walls of the inner cylinder 10.

The function of the inner translucent isotropic cylinder 10 is to conceal the light source, while permitting its rays to pass through it to the polarizer tube 11.

Since the polarizer tube 11 is of homogeneous polarizing material, its polarizing axis, even though in cylindrical form, does not vary when the cylinder is rotated about its longitudinal center line. Hence it would be impossible to achieve changing color effects merely by so rotating the cylinder. There would be no change in the polarizing axis.

It has been discovered that this can be obviated by the utilization of birefringent material in conjunction with the polarizing tube. When a beam of polarized light is incident upon a point of a surface of a doubly refracting body, there arises in the body two beams, the direction of vibration of one of which is perpendicular to the other. One of the beams is propagated more rapidly than the other. Birefringent material is characterized by its so-called "significant axis or direction." This refers to the projection onto its surface of the direction of vibration of the light of that one of the two beams which is propagated most rapidly. If such birefringent material intercepts polarized light it has the effect of altering the axis of polarization of the polarized light.

A series of strips 18 of birefringent material all extending parallely with the longitudinal center line of the "Polaroid" tube, are applied side by side to the peripheral surface of the "Polaroid" cylinder 11. They extend in the longitudinal direction of the latter and each subtends an angle of approximately five degrees. The birefringent strips 18 have progressively different "significant axes or directions." Any suitable birefringent material may be used. As a practical expedient a birefringent material suitable for preparing the strips is "Scotch cellulose tape" or other Cellophane that is adhered or glued to the Polaroid cylinder 11. Scotch cellulose tape is a commercial Cellophane provided with an adhesive surface of isotropic material. It is the most convenient birefringent material to apply to the Polaroid cylinder in the form of strips. In such Scotch cellulose tape the direction of vibrations in the two rays arising from a normally incident beam are substantially parallel and perpendicular to the edge of the mill roll of the Cellophane as originally produced.

In order to produce strips of Cellophane having the desired orientation of their significant axes or directions, sheets A, B, C, D (Figs. 4–7 incl.) are provided. The significant axis of each sheet lies parallel, for example, with its side edge. In the first sheet A, the strips 18a are all cut parallel with the side edge. In the second sheet B, the strips 18b are each cut at an angle of, for example, five degrees, with its side edge. In the third sheet C, the strips 18c are each cut at a larger angle with the corresponding side edge of the sheet C, for example, an angle of ten degrees. Similarly in the sheet D, the strips 18d are cut at a larger angle, say fifteen degrees, with the side edge.

In applying strips 18 to the "Polaroid" cylinder 10, a strip 18a cut from sheet A is applied to the cylinder, extending in the axial direction. A second strip 18b cut from a sheet B is applied to the cylinder parallel with and adjacent to strip 18a. This strip 18b on rotation into parallelism with the strip 18a for application to the Polaroid tube, results in a rotation of the significant axis of the strips 18b so that it is five degrees different from that of the strip 18a. Similarly, as each succeeding strip cut from the appropriate sheet C, D, etc., is applied successively in parallelism with the strips previously applied to the Polaroid cylinder, its significant axis is five degrees different from that of each strip adjacent to it. As a result, the completely strip-applied "Polaroid" cylinder 11 has an orderly succession of longitudinally extending strips each subtending approximately an arc of five degrees and each having its significant axis progressively five degrees different from that one preceding it. The angles of the significant axes progress uniformly in five degree stages. While five degree steps have been chosen it is to be understood, of course, that other angles of progression may be chosen for the successive axes of polarization and also that the angular width of the strips can be varied from the five degree width specified hereinabove.

An isotropic sheet 20 is supported suitably on the stationary casing 13. The sheet is removably attached at 21 to the frame or casing 14. Preferably it is of matte cellulose acetate or of "Vinylite" or other suitable isotropic transparent or translucent material. This sheet has mounted on it in any suitable way a suitable design for example, the figure of the house H and trees T seen in Fig. 1. The various elements of the design are built up of one or more layers 25, 26, 27 of birefringent material such as Scotch tape Cellophane or the like, in the manner described in the aforementioned application. Briefly recapitulated, the design is built up of one or more layers 25, 26, etc., of birefringent material. Some of the portions of the design have fewer layers than others and the significant axes of the birefringent material in various of the layers varies in accordance with the effects that it is desired to have produced by the action of the light beams emerging from the Cellophane strips 18, 18a, 18b, etc., as will be presently described. The isotropic sheet 20 bearing the said design is curved, its curvature being preferably concentric with that of the cylinders 10 and 11 and the design is suitably adhered to it.

An analyzer 30 consisting of a sheet of polarizing material preferably "Polaroid" with its polarizing axis either parallel to or crossed with respect to the polarizing axis of the "Polaroid" tube 11 or at any other desired angle with respect to the polarizing axis of the said tube 11, is provided. This sheet, too, is curved its curvature being concentric with that of sheet 20 and tubes 10 and 11, and is positioned to lie in front of the design or pattern on the sheet 20. In the embodiment shown, this analyzer 30 and the pattern-bearing sheet 20, are substantially semicircular in form, being secured to the frame 13 at 21. It is to be understood that the spacing between the analyzer 30 and the pattern-bearing sheet 20 is anything desired. In a practical embodiment, they were in direct contact. Likewise, the spacing between the cylinders or tubes 10 and 11, and the isotropic sheet 20, is immaterial.

The cylinders 10 and 11 with strips 18 thereon, may be rotated in any other way than by the motor driven gearing 14. For example, in the embodiment shown in Fig. 9, the cylinder consisting of the parts hereinbefore described, namely, the cylinders 10, 11 and the strips of Cellophane 18 thereon, are adapted to be rotated by a means other than the gear drive 14. To this end, a suitable heat motor drive may be used. For example, a series of fan or propeller blades 40 may be carried suitably in and secured to the inner cylinder 10. These fan blades are located above the light tube 17. The heat generated by the tube 17 while it is lit creates convection currents of air that rise. These currents in impinging upon the blades cause the latter to rotate, rotating with them the cylinders 10 and 11 which, of course, are suitably supported in freely rotatable manner.

In operation of the devices described, the light sources 16 or 17 give substantially uniform distribution along the whole axis of the light source and consequently along the cylinder 10. The latter conceals the light source and diffuses the light which then passes to the polarizer tube 11. The light that passes through the tube 11 is all polarized by it in the direction of the polarizing axis of the material of which the tube is made. However, the axis of polarization of the polarized light emerging from the "Polaroid" cylinder 11 that reaches the design and ultimately the eye of the viewer through the analyzer is successively altered or varied by the succeeding strips of Cellophane 18 that move with the rotating cylinders 10 and 11 and intercept the polarized light rays passing toward the design. In the embodiments shown, the successive changes in axes of polarization are approximately 5° because each succeeding strip 18 has its axis of polarization 5° different from that to right and left thereof.

The constantly changing axis of polarization of the polarized light falling on the design carried by sheet 20 causes changing and flowing colors in the birefringent design when viewed through the analyzer 30.

This is caused by the fact that as each strip 18 of Cellophane in its movement passes behind an element of the birefringent design, the optical retardation and polarization of the light entering the design will change. Apparent flow of color from one part of the design to another can be produced by progressive variation in the optical orientation of the birefringent material of the design. This flow can be made to take place in any desired direction, even opposite to the direction of rotation of the polarizing tube. Areas in the design can be made to appear to change size, and many other weird effects can be produced by properly arranging the elements of the birefringent design in the manner described in detail in the aforementioned application.

The action of the birefringent material of the design is to split the polarized beams into two beams at right angles and out of phase. The analyzer 30 restores the beams to plane polarized condition and integrates them to produce interferences whereby one color or another of the spectrum is cancelled out. This action of the birefringent design and analyzer together with the successively varying axis of polarization of the light reaching the birefringent design which results from the action of the Cellophane strips 18, produces the novel color and other effects that have been described.

Figure 8:
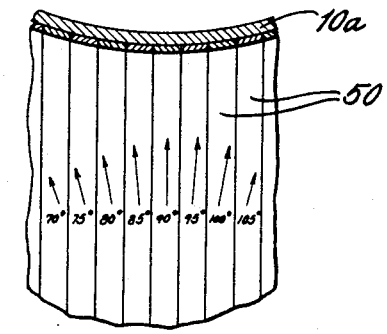
Fig. 8 is a fragmentary elevation of a modified form of device.
Figure 10:
Fig. 10 is a top plan view of the latter device.

As shown in Fig. 8, it is possible to provide changing axes of polarization by eliminating the Cellophane strips 18 and by substituting for the inner "Polaroid" tube 11 a tube made of segments 50 of "Polaroid" prepared in the same way as the strips of Cellophane 18 were prepared. These strips are applied directly to the tube 10a which is identical with the tube 10 of the other figures. These strips 50 have successively different axes of polarization. As shown, a 5° change in axis of polarization occurs in each succeeding strip.

Considerable care must be used in making the polarizing cylinders of Figs. 1, 2, 3, 8 and 9. In the case either of Cellophane strips 18 or of "Polaroid" strips 50, too large a change in the angle of polarization from one strip to the other will cause a striped appearance in the design viewed through the analyzer 30, whereas if the angular change is small enough the color will appear to flow quite smoothly in the design. The 5° change both in axis of polarization and in the angle subtended by each strip 18 or 50 is a good compromise between smoothness of color flow and ease of manufacture. Smaller angular changes are contemplated as well as larger ones.

Shrinkage of the Cellophane or Polaroid strips 18 or 50 which would leave gaps between adjacent strips that would produce disturbing effects as the cylinders bearing these strips revolved, can be prevented by laminating a coating of isotropic material such as "Vinylite," cellulose acetate or other isotropic material over the strips to seal them from atmosphere.

It is to be understood that various other changes may be made in practice without departing from the spirit of this invention. There is no intention of limitation to the exact details shown and described.

Having described our invention, what we claim as new and desire to protect by Letters Patent is:

1. A device of the character described comprising a translucent hollow member of uniform cross sectional area throughout its length, a hollow body also of uniform cross sectional area throughout its length coaxial with and externally of said member, a source of light within said member, said body including a series of adjacently arranged parallel, longitudinally extending strips of polarizing material, each strip of the same width applied to the peripheral surface of said hollow body and each strip having the same significant axis throughout its length and each strip having a progressively different significant axis than the adjacent ones, with the changes in significant axis progressing in uniform steps, an analyzer whose wall is curved and whose curvature is concentric with that of said first-named member arranged in front of a portion at least of said hollow body and of said strips, a light-permeable member of isotropic material whose wall is curved and whose curvature likewise is concentric with that of said first-named member interposed between the said strips and the said analyzer, a birefringent design arranged on the surface of said light-permeable member, and means to rotate said first-named member, said body and said strips about their concentric axis whereby light emanating from said light source toward an observer of said birefringent design who is located externally of said analyzer will undergo progressive alterations in axis of polarization, said alterations being effected by the progressive change in significant axis of the strips of polarizing material as they succeed each other in the light path reaching the observer during their movement.

2. A device of the character described comprising a translucent cylindrical member, a cylindrical polarizer coaxial therewith and externally thereof, a source of light within said polarizer, a series of adjacently arranged longitudinally extending strips of birefringent material, each strip of the same width applied to the peripheral surface of the polarizer, and each strip having the same significant axis in its length and each strip having a progressively different significant axis than the adjacent ones, with the changes in significant axis progressing in uniform steps of approximately 5°, a semi-cylindrical analyzer arranged concentrically with said cylindrical member and arranged in front of a portion at least of said polarizer and said strips, a cylindrical light-permeable member of isotropic material concentric with said first-named member interposed between said strips and said analyzer, a birefringent design arranged on the surface of said light-permeable member, and means to rotate said first-named member, said polarizer and said strips about their common axis of concentricity whereby light emanating from said light source toward an observer of said birefringent design who is located externally of said analyzer will undergo progressive alterations in axis of polarization, said alterations being effected by the progressive change in significant axis of the birefringent strips as they succeed each other in the light path reaching the observer during their movement.

3. A device of the character described comprising a translucent cylindrical member, a source of light within said member, a series of adjacently arranged longitudinally extending strips of Polaroid material, each strip of the same width applied to the peripheral surface of the cylindrical member, and each strip having the same axis of polarization in its length and each strip having a progressively different principal axis of polarization than the adjacent ones with the changes in axis of polarization progressing in uniform steps of approximately 5°, a semi-cylindrical analyzer concentric with said first-named member arranged in front of a portion at least of said first-named member and said strips, a semi-cylindrical light-permeable member of isotropic material concentric with said first-named member interposed between said strips and said analyzer, a birefringent design arranged on the surface of said light-permeable member, and means to rotate said first-named member, and said strips about their common axis of concentricity whereby light emanating from said light source toward an observer of said birefringent design who is located externally of said analyzer will undergo progressive alterations in axis of polarization, said alterations being effected by the progressive change in principal axis of polarization of the strips as they succeed each other in the light path reaching the observer during their movement.

4. A device of the character described comprising a translucent hollow member having uniform cross sectional areas throughout its length, a source of light within said member, a series of adjacently arranged longitudinally extending strips of polarizing material, each strip being of the same width and applied about the peripheral surface of the hollow member, and each strip having the same axis of polarization in its length, and successive strips having progressively different principal axes of polarization, with the changes in axes of polarization progressing in uniform steps, a curved analyzer whose curvature is concentric with that of said hollow member arranged in front of a portion at least of said hollow member and said strips, a curved light-permeable member of isotropic material whose curvature is concentric likewise with that of said hollow member interposed between the said strips and said analyzer, a birefringent design arranged on the surface of said light-permeable member, and means to rotate said hollow member, and said strips about their concentric axis whereby light emanating from said light source toward an observer of said birefringent design who is located externally of said analyzer will undergo progressive alterations in axis of polarization, said alterations being effected by the progressive change in principal axis of polarization of the strips as they succeed each other in the light path reaching the observer during their movement.

5. A device of the character described comprising a translucent hollow body of uniform cross sectional area throughout its length, a hollow polarizer also of uniform cross sectional area throughout its length lying concentric with and externally of said first-named body, a source of light within said first-named body, a series of adjacently arranged longitudinally extending strips of birefringent material, each strip being of the same width applied to the peripheral surface of said hollow polarizer, and each strip having the same significant axis throughout its length, and each strip having a progressively different significant axis from the adjacent ones, with the changes in significant axis progressing in uniform steps, an analyzer whose wall is curved and concentric in its curvature with that of said first-named body arranged in front of a portion at least of said hollow polarizer and said strips, a light permeable member of isotropic material interposed between the said strips and the said analyzer, a birefringent design arranged on the surface of said light permeable member, and means to rotate said hollow body, said polarizer and said birefringent strips about their concentric axis whereby light emanating from said light source toward an observer the said birefringent design who is located externally of said analyzer will undergo progressive alterations in axis of polarization, said alterations being effected by the progressive changes in significant axes of the birefringent strips as they succeed each other in the light path reaching the observer during their movement.

FFORD BURCHELL.
BARBARA IVINS.